United States Patent Office 3,331,009
Patented July 11, 1967

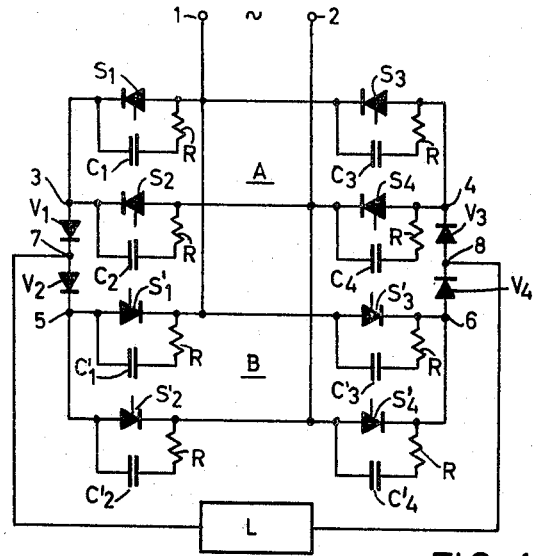
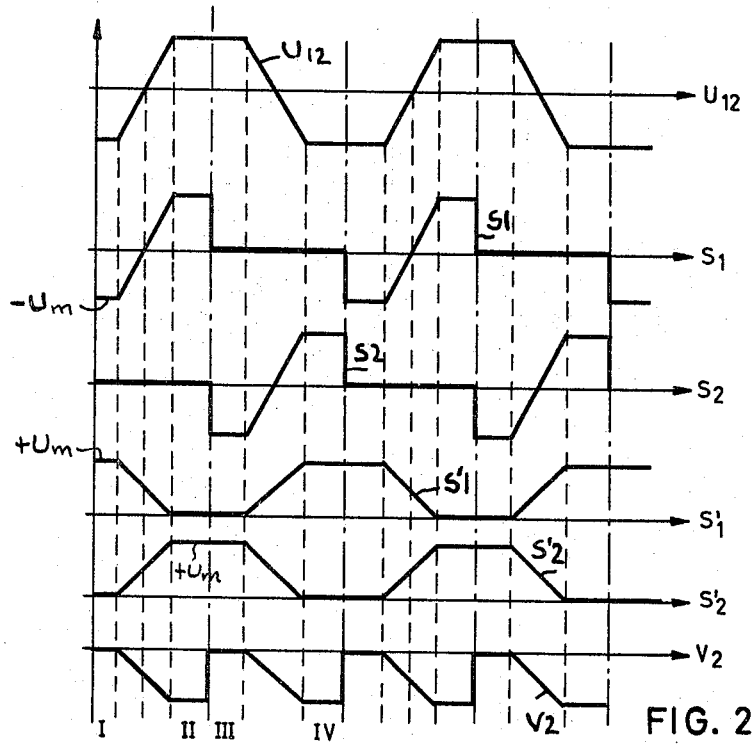
FIG. 1
FIG. 2

3,331,009
RECTIFIER SYSTEM FOR CONTROLLING THE MAGNITUDE AND POLARITY OF DIRECT VOLTAGE BY MEANS OF TWO RECTIFIER BRIDGE NETWORKS
Konrad Samberger, Finsing, and Gudrun Seidl, Munich, Germany, assignors to Siemens-Schuckertwerke Aktiengesellschaft, Berlin-Siemensstadt and Erlangen, Germany, a corporation of Germany
Filed Sept. 29, 1964, Ser. No. 400,013
Claims priority, application Germany, Sept. 30, 1963, S 87,618
3 Claims. (Cl. 321—8)

Our invention relates to a system for feeding a load from an alternating-current supply with rectified voltage of controllable magnitude and polarity.

It is known to provide such a system with two rectifier bridge networks whose individual legs are equipped with controllable rectifiers and which are connected in mutually anti-parallel relation to common load buses so that the polarity of the rectified load voltage depends upon which of the two rectifier networks is blocked while the other is more or less conductive at a specific time. The magnitude of the load voltage is controlled in the conventional manner by varying the phase position of the firing pulses supplied to the controllable rectifiers, relative to the zero passages of the alternating feeder voltage impressed upon the rectifiers.

In the operation of such systems there have occurred short circuits whose cause, at first, was obscure. It was found that the alternating-voltage feeders became short-circuited through one leg of a conducting bridge network and one leg of the other, supposedly blocked bridge network then not receiving any firing pulses. It has been found that semiconductor controlled rectifiers (thyristors) may fire even if they do not receive firing pulses, if the gradient of the voltage impressed upon the rectifier in the forward direction (rate-of-rise of forward voltage $dv/dt$) exceeds a critical value. Thorough investigation has shown that potentially dangerous voltage gradients occur in the controllable rectifiers of the supposedly blocked bridge network during each half wave and may reach particularly high values if the load has an inductive component, because then the previously conducting leg of the bridge network has not yet attained blocking ability at the moment when the rectifier in the next following leg is being fired. In the most unfavorable case, the voltage at a controllable rectifier in a leg of the bridge network not supposed to be in operation at that time, may abruptly jump up to the maximum value of the feeder voltage. Since this high voltage peak stresses the controllable rectifier in the forward direction, the high rate of voltage rise may cause firing of this particular rectifier in the supposedly inactive network, thus causing the above-mentioned short-circuiting of the feeder voltage.

It is an object of our invention, relating to systems of anti-parallel connected rectifier bridge networks for controlling the magnitude and polarity of the rectified voltage, to reliably prevent such short-circuiting of the alternating feeder voltage.

More specifically, it is an object of the invention, relating to systems of the type mentioned, to maintain the increasing voltage at the controllable rectifiers of the network not to be active at a specific time, at such a low value that firing of the rectifiers in the inactive network cannot occur even under most unfavorable conditions of operation.

To this end, and in accordance with our invention, we connect capacitors in parallel relation to each of the controllable rectifiers in both bridge networks, and we further place blocking diodes between each of the four direct-current output terminals of the two rectifier bridge networks, on the one hand, and the two direct-current load buses, on the other hand.

Each capacitive shunt circuit across the respective controllable rectifiers may also comprise a resistor in series with the capacitor.

When using semiconductor controlled rectifiers (thyristors), it has become conventional practice to provide them with a shunt-connected capacitor and sometimes with such a capacitor in series with a resistor, for the purpose of minimizing disturbance by the hole storage effect. In such cases, our invention is applicable in a particularly simple manner because it only requires the provision of four additional diodes.

An embodiment of a rectifier system according to the invention is illustrated by way of example in the accompanying drawing, in which:

FIG. 1 is a schematic circuit diagram of the system, and

FIG. 2 shows voltage-time graphs explanatory of the operation of the system.

According to FIG. 1, two alternating-current feeder buses 1 and 2 are connected to two bridge networks A and B, each having four legs equipped with controllable rectifiers $S_1$, $S_2$, $S_3$, $S_4$ (bridge network A) and $S'_1$, $S'_2$, $S'_3$, $S'_4$ (bridge network B). The direct-current output points or terminals of network A are denoted by 3 and 4, the corresponding points or terminals of network B are denoted by 5 and 6. The direct-current load buses leading to a load L have respective terminal points 7 and 8. Terminal point 7 is connected through diodes $V_1$ and $V_2$ with the output points 3 and 5 of respective networks A and B. The load-bus terminal 8 is connected through diodes $V_3$ and $V_4$ with the output points 4 and 6 of respective networks A and B. A capacitor is connected parallel to each of the controllable rectifiers and denoted by C with an index identical with that of the one controllable rectifier to which the capacitor is shunt connected (for example capacitor $C_1$ is connected with controllable rectifier $S_1$). If desired, a resistor may be connected in series with each capacitor, as is the case in the illustrated embodiment where some of these resistors are denoted by R.

The firing electrodes of the individual rectifiers are connected to a trigger circuit which, in the same manner as in the above-mentioned known system, is designed to maintain all of the rectifiers in one network blocked while those of the other network are operative under phase control of their respective firing moments relative to the zero passages of the feeder voltage, to apply between the load buses a rectified voltage of a controlled mean magnitude whose polarity is determined by which particular network is blocked at the time. Such a trigger circuit is shown schematically in FIG. 1 for only one of the rectifiers in each network, although it will be understood that each individual controlled rectifier of the system must be connected to the trigger circuits in an analogous manner as known and practiced in this art. Reference for an example of a thyristor trigger circuit may be had to Electronics, June 29, 1964, page 46 or to the copending application Ser. No. 416,198, filed Dec. 3, 1964, of H. Poppinger et al.

In the explanatory graphs shown in FIG. 2, the abscissa denotes time and the ordinate denotes voltage. The top diagram represents the voltage $U_{12}$ between the alternating-voltage feeder buses 1 and 2. The other graphs indicate the voltages impressed across the controllable rectifiers $S_1$, $S_2$, $S'_1$, $S'_2$ and upon the diode $V_2$, these voltages being denoted by the same respective reference characters as the rectifiers and the diode.

The load L is assumed to have an inductive component and, for simplicity, the alternating voltage $U_{12}$ is presumed to have a trapezoidal wave shape. In the interval of time denoted by I, the voltage of feeder bus 1 is negative relative to the voltage of feeder bus 2. In this interval I, the rectifiers $S_2$ and $S_3$ of bridge network A are conducting, and all of the controllable rectifiers in bridge network B are blocked. The direct current flows from feeder 2 through controllable rectifier $S_2$, diode $V_1$, load L, blocking valve $V_3$ and controllable rectifier $S_3$ to feeder 1. Under these conditions, the maximal blocking voltage $U_m$ is applied to the controllable rectifier $S_1$, and the bridge output terminal 7 has the potential of feeder bus 2 which is positive relative to feeder 1. Consequently in interval I the diode $V_2$ is conducting, while the controlled rectifier $S'_1$ is stressed by the maximally possible voltage $U_m$ in the forward direction. The voltage at $S'_2$, however, is zero.

At the end of interval I, the feeder voltage $U_{12}$ commences to decrease. The potential of output terminal 5 in bridge network B now varies by $\Delta U/2$ when the feeder voltage $U_{12}$ varies by $\Delta U$. Accordingly, a voltage is impressed in the blocking direction upon the diode $V_2$ commencing at the end of the interval I. As a result, from the same moment on the two capacitors $C'_1$ and $C'_2$ are connected in series between the feeders 1 and 2, the capacitor $C'_1$ having been charged up to the voltage $U_m$ at the end of the interval I. Since the charge of this capacitor cannot flow off through the diode $V_2$, this charge is taken up by the capacitor $C'_2$ which reaches its maximal voltage at the beginning of the interval II. At this moment the capacitor $C'_1$ is completely discharged. At the beginning moment of the interval II, therefore, the controllable rectifier $S'_2$ is impressed by the maximum voltage $U_m$ in the forward direction. However, the increase in voltage is continuous. Consequently, when the rectifiers $S_1$ and $S_4$ in network A are fired at the beginning of the interval III, no further voltage jump can occur at the rectifier $S'_2$. Only the blocking voltage at the previously blocked diode $V_2$ suddenly drops to zero. The diode $V_2$ remains conducting as long as the feeder voltage $U_{12}$ does not change, and hence conducts until the end of the interval III.

For the purpose of explanation, now assume that the diodes $V_1$ and $V_2$ are shorted (or not interposed). Then the potential at output point 5 of bridge network B at the firing moment of the rectifier $S_1$ will still correspond to the potential of feeder 2 because the rectifier $S_2$, on account of the inductive component of the load, remains conducting until the rectifier $S_1$ is fired at the end of the interval II. This, however, has the effect that now the rectifier $S'_2$ in network B is abruptly stressed by the maximally possible voltage in the forward direction. When due to this high voltage this rectifier is fired, the feeder 1 is connected with feeder 2 through the rectifiers $S_1$ and $S'_2$. By virtue of the invention, however, such short circuits can no longer occur because the invention enforces a gradual and continuous voltage change at the rectifiers of the particular bridge network that is not subject to controlled forward conductance at a time, as will be understood from the graphs shown in FIG. 2 explained in the foregoing.

We claim:

1. A rectifier system for providing a controllable direct voltage of reversible polarity, comprising alternating current feeders, two direct-current load buses, two rectifier bridge networks having respective input points connected to said feeders and each having two output points connected to said respective load buses, each of said networks having controllable rectifiers for varying the rectified voltage, said controllable rectifiers of each network being poled in opposed relation to those of the other network for reversing the direct-voltage polarity by blocking said controllable rectifiers in a selected one of said networks, blocking diodes serially interposed between said respective output points and said load buses, each of said diodes having the same poling as the controllable rectifiers of the network to whose output point said diode is electrically adjacent, and capacitors connected in parallel relation to said controllable rectifiers respectively.

2. A rectifier system for providing a controllable direct voltage of reversible polarity, comprising alternating-current feeders, two direct-current load buses, two rectifier bridge networks having respective input points connected to said feeders and each having two output points connected to said respective load buses, each of said networks having thyristors poled in opposed relation to those of the other network for reversing the direct-voltage polarity by blocking the thyristors in a selected one of said networks, control means connected to said thyristors for selectively blocking the thyristors of one network and phase controlling the thyristors of the other network to vary the rectified voltage, four blocking diodes serially interposed between said respective output points and said load buses, each of said diodes having the same poling as the thyristors of the network to whose output point each diode is electrically adjacent, impedance shunts connected parallel to said respective thyristors, each of said shunts comprising a capacitor.

3. In a rectifier system according to claim 2, said impedance shunt comprising a resistor in series with said capacitor.

References Cited

UNITED STATES PATENTS

| | | | |
|---|---|---|---|
| 2,629,847 | 2/1953 | Eames et al. | 318—146 |
| 3,018,438 | 1/1962 | Mustert | 321—46 X |
| 3,210,639 | 10/1965 | Stringer et al. | 321—27 X |

JOHN F. COUCH, *Primary Examiner.*

W. M. SHOOP, *Assistant Examiner.*